(No Model.)
J. W. BOYD & G. W. HURLBUTT.
CARTRIDGE IMPLEMENT.
No. 358,769. Patented Mar. 1, 1887.
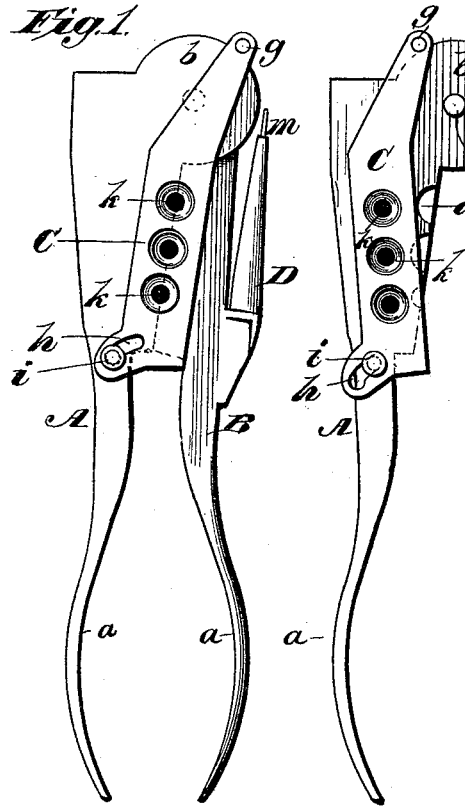
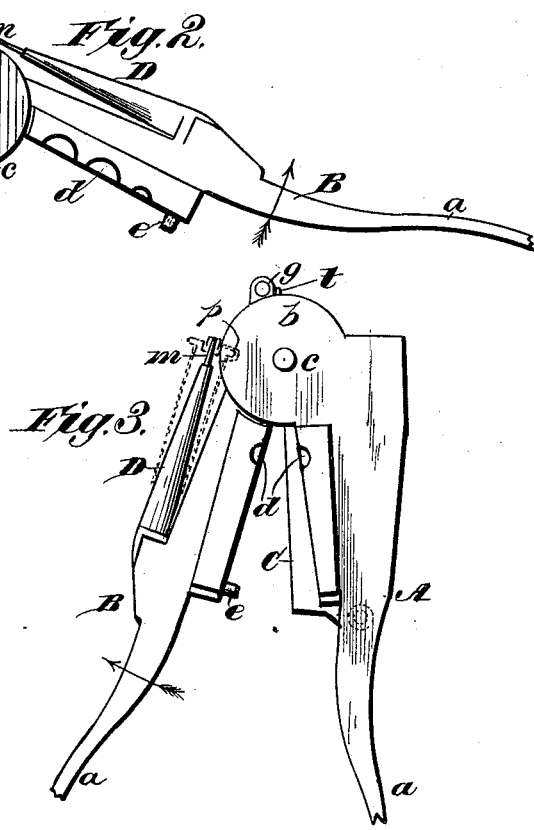
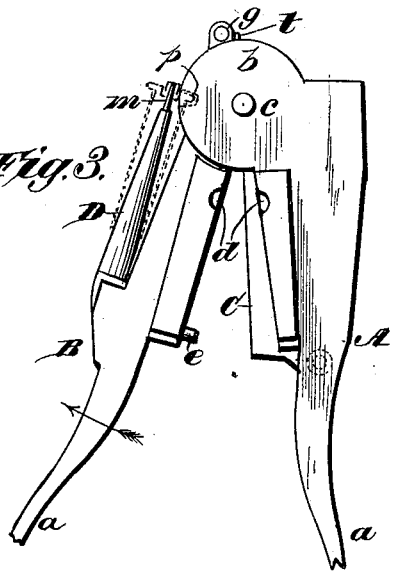
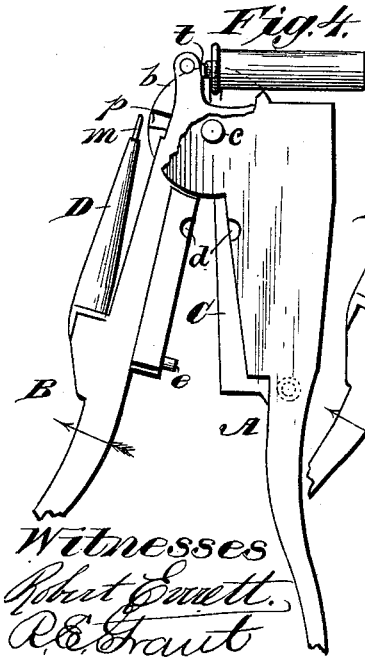
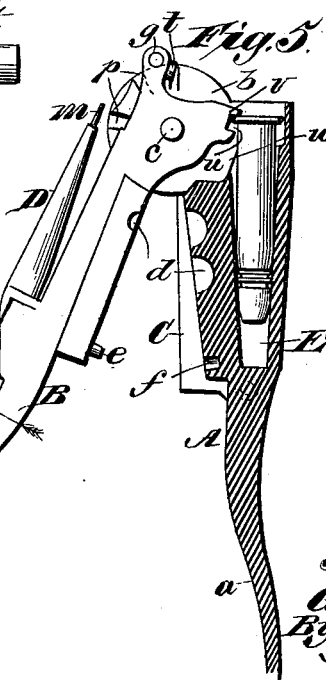
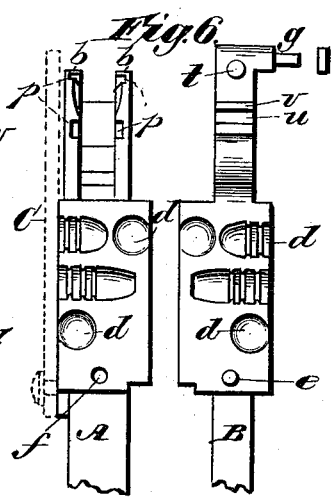
Witnesses
Robert Everett
R. E. Trant
Inventors.
James W. Boyd
George W. Hurlbutt
By A. R. Brown
Atty.

UNITED STATES PATENT OFFICE.

JAMES W. BOYD AND GEORGE W. HURLBUTT, OF CHADRON, NEBRASKA, ASSIGNORS TO SAID BOYD AND HENRY A. LYON, OF SIOUX CITY, IOWA.

CARTRIDGE IMPLEMENT.

SPECIFICATION forming part of Letters Patent No. 358,769, dated March 1, 1887.

Application filed June 22, 1886. Serial No. 205,922. (No model.)

*To all whom it may concern:*

Be it known that we, JAMES W. BOYD and GEORGE W. HURLBUTT, citizens of the United States, residing at Chadron, in the county of Dawes and State of Nebraska, have invented certain new and useful Improvements in Cartridge Implements; and we do hereby declare the following to be a full, clear, and exact description of the invention, such as will enable others skilled in the art to which it appertains to make and use the same.

Our invention relates to an improved implement in which are combined in a single tool all the appliances necessary for loading, reloading, capping, and uncapping cartridge-shells for rifles and revolvers, and for molding balls or conical bullets to be seated in said shells.

The invention consists of a cartridge implement composed of a number of compact operative parts, constructed and combined as hereinafter set forth, to accomplish the several operations of bullet-molding and loading, capping, and uncapping of cartridge-shells, with great nicety, rapidity, and convenience.

In the annexed drawings, illustrating the invention, Figure 1 is a side elevation of our improved cartridge-tool with jaws closed and showing the automatic cutter for trimming the necks of the newly-made bullets to make them ready for insertion in the cartridge-shell. Fig. 2 is a view of the implement with jaws extended to their full limit, showing the action of the cutter in trimming the bullets. Fig. 3 is a view of the opposite side of the implement, representing the manner of using it to eject an exploded cap or primer, the shell being shown in dotted lines. Fig. 4 shows the manner of using the implement to seat a new cap or primer. Fig. 5 is a longitudinal section representing the implement, with jaws partly opened, in the act of seating the bullet in the shell. Fig. 6 represents an inside view of the pivoted jaws disconnected to illustrate the construction of the implement more clearly.

The implement is formed with two jaws, A and B, pivoted together at one end and provided with handles $a$ $a$ at their free ends. The pivoted end of the jaw A is provided with two parallel disk-shaped lugs $b$ $b$, through which passes a pin, $c$, on which the opposite jaw, B, is pivoted.

In the inner or opposing faces of the jaws A and B are formed a series of circular and elongated concavities, $d$, which, when the jaws are closed, serve as molds for balls and conical bullets of various sizes. One of these jaws has a stud, tenon, or pin, $e$, at the lower end of its inner face, to wedge into a corresponding recess or mortise, $f$, in the inner face of the opposite jaw, and so hold the bullet-molds firmly in a closed position for use.

The pivotal end of the jaw B extends slightly above the lugs $b$ $b$ of the other jaw, and is provided with a laterally-projecting stud, $g$, on which is pivoted one end of an automatic cutter, C, the other end of which is provided with a curved or eccentric slot, $h$, working on a pin, $i$, attached to the jaw A, as shown in Figs. 1 and 2. This cutter C is provided with a series of circular knife-edged openings, $k$, that coincide with the mouths of the closed bullet-molds. After the balls or bullets have been formed in the molds $d$, the act of opening the jaws A B causes the cutter C to move automatically across the mold-mouths, whereby the sharp edges of the openings $k$ cut off the necks of the bullets and make them ready for attachment to the shells.

On the outer side of the jaw B and parallel therewith is a conical spindle, D, for expanding the shell, and at the reduced end of this spindle D is a fixed cap, ejecting-stud, or nipple, $m$, for removing an exploded cap or primer from its seat in the shell. The manner of using the implement to expand the crimped end of a cartridge-shell and eject the exploded primer is shown in Fig. 3, the shell being represented in dotted lines with its flange engaged in opposite notches, $p$ $p$, a radial series of which are formed in the inner faces of the disks $b$ $b$ at their peripheries. When the shell is placed on the conical spindle D, and engaged with the radially-notched disks or lugs $b$ $b$, as shown, the act of opening the jaws A B rotates said disks toward and past the spindle end, and forces the shell down on the expanding-spindle D and cap-ejecting stud or nipple $m$, thereby opening the shell for reception of a ball and ejecting the exploded cap or primer in one movement.

The inner faces of the disks $b\ b$ are provided with a series of corresponding radial notches, $p\ p$, located at suitable intervals, to facilitate the handling of shells of varying length.

On the inner side of the jaw B, above the pivot $c$, is a broad-faced stud, $t$, for seating a new cap or primer. By arranging the shell across the end of the closed implement with the shell-flange engaged in the upper pair of notches, $p\ p$, the cap, which has previously been inserted in the shell-pocket, will be accurately and safely seated by the stud $t$ in the act of opening the jaws, as shown in Fig. 4.

In the jaw A is a longitudinally-arranged chamber, E, of cylindrical form, for receiving the loaded cartridge-shell with ball inserted. It will be seen in Fig. 5 that the inner end of this ball-seating chamber E is made slightly tapering, so that as the cartridge is forced into said chamber the ball will be firmly seated in and secured to the shell by pressure against the chamber-walls. While the implement is closed the loaded cartridge with bullet attached is inserted into the chamber E through the chamber-mouth, which is located in the end of the jaw A, and the flange of the shell is engaged in a transverse notch, $u$, formed in a lug, $v$, on the pivotal portion of the opposite jaw. By now separating the jaws of the implement the notched lug $v$ will carry the cartridge into the chamber E with sufficient force to securely unite the ball and shell without liability of explosion, as no pressure is exerted upon or against the cap. In order to withdraw the cartridge the jaws of the implement should be closed or brought together, thereby retracting the shell and attached bullet sufficiently to enable the shell to be grasped with the fingers, and thus removed.

The inner side of the chamber E at its open end is cut away, as shown at $w$, Fig. 5, to enable the flange of the shell to be engaged with the notched lug $v$ in seating the bullet, and also to afford ample space for the movement of said lug when the implement is opened to its full extent in the act of operating the automatic cutter C for trimming the bullets in the molds.

The action of the implement in the various uses for which it is intended is so simple and obvious that further explanation is deemed unnecessary. By its use all the operations of cartridge loading and reloading can be quickly and safely performed, while the construction and arrangement of parts are such as to afford a convenient and reliable implement.

It will be observed that the ball-seating chamber E receives the shell its entire length, including its flange, during the operation of uniting the shell and ball, thus effecting a neat and secure connection without difficulty or loss of time. It is also apparent that, if desired, the operations of expanding the shell, ejecting its cap or primer, and seating a new cap in another shell can be performed simultaneously and with the same movement.

What we claim as our invention is—

1. In a cartridge implement composed of pivoted jaws having bullet-molds formed in the opposing faces thereof, the combination, with said jaws and molds, of an automatic trimming-cutter pivoted to the pivotal end of one jaw, beyond the pivot-pin that connects said jaws, and having a sliding connection with the handle end of the other jaw, whereby the cutter is actuated by opening said jaws, substantially as described.

2. In a cartridge implement composed of pivoted jaws, the combination, with a conical spindle carried by the outer face of one of said jaws and formed at its extremity with a fixed cap-ejecting nipple, of a pair of notched disks formed on the pivotal end of the opposite jaw, said disks being adapted to grasp the flange of the shell and rotate toward the spindle in the act of opening the jaws, substantially as described.

3. In a cartridge implement composed of pivoted jaws, the combination, with a stud on the inner face of one jaw at its pivotal end, of a pair of disks carried by the pivotal end of the other jaw, and provided with corresponding radial notches for the purpose of holding the shell and seating the cap or primer, substantially as described.

4. In a cartridge implement composed of pivoted jaws, the combination, with a ball-seating chamber formed longitudinally in one of said jaws and having its inner side cut away at its open end, said chamber being adapted to receive the entire length of the shell, including its flange, of a transversely-notched lug carried by the pivotal end of the other jaw and adapted to grasp the flange of the shell, said lug being moved in and out of the cut-away side of said chamber in the act of opening and closing the jaws, substantially as described.

5. A cartridge implement composed of the pivoted jaws A B, having bullet-molds formed in their opposing faces, and the automatic cutter C, pivoted to the pivotal end of the jaw B and having a sliding connection with the jaw A, said jaw A being provided with a bullet-seating chamber, E, cut away on the inner side of its open end, and the jaw B, having a notched lug, $v$, moving in said cut-away portion of said chamber, substantially as described.

6. A cartridge implement composed of the jaw A, having notched disks $b\ b$, and a ball-seating chamber, E, cut away at the inner side of its open end, and the jaw B, pivoted between said notched disks and provided with a notched lug, $v$, working in said cut-away portion of said chamber, a cap-seating stud, $t$, and a conical spindle, D, having a cap-ejecting nipple, *m*, at its extremity, substantially as described.

7. The combined cartridge implement herein described, composed of the pivoted jaws A B, having bullet-molds in their inner faces, one of said jaws being formed at its pivotal end with a pair of radially-notched disks, *b b*, and having a longitudinal chamber, E, and the other jaw being provided on the inner face of its pivotal end with a stud, *t*, and having a conical spindle, D, on its outer face, and the automatic cutter C, pivoted to the pivotal end of one jaw and having a sliding connection with the handle end of the other jaw, substantially as described.

In testimony whereof we affix our signatures in presence of two witnesses.

JAMES W. BOYD.
GEORGE W. HURLBUTT.

Witnesses:
JAMES M. DAVIDSON,
P. E. BAIRD.